United States Patent [19]

Lee

[11] 3,777,161
[45] Dec. 4, 1973

[54] HODOSCOPE READOUT SYSTEM

[75] Inventor: Lap Yen Lee, Houston, Tex.

[73] Assignee: The United States of America as represented by the United States Atomic Energy Commission, Washington, D.C.

[22] Filed: Nov. 8, 1972

[21] Appl. No.: 304,863

[52] U.S. Cl................. 250/361, 250/367, 250/369
[51] Int. Cl. ........................................... G01j 39/18
[58] Field of Search.................. 250/71.5 R, 71.5 S, 250/361, 367, 369

[56] References Cited
UNITED STATES PATENTS

| 3,594,577 | 7/1971 | Loveday | 250/71.5 R |
|---|---|---|---|
| 3,265,892 | 8/1966 | Sheldon | 250/71.5 R |
| 3,717,767 | 2/1973 | Gold et al. | 250/83.6 R |

*Primary Examiner*—Harold A. Dixon
*Attorney*—John A. Horan

[57] ABSTRACT

A readout system has been provided for reading out a radiation multidetector device with a reduced number of signal sensors. A radiation hodoscope, such as an array of scintillation counters, multiwire proportional counter array, or a set of multidetectors which do not receive signals simultaneously, is divided into equal numbered groups. A first group of signal terminals is connected to the equal numbered groups of detectors so that a signal from any one of the detectors of a group will be fed to an individual one of the first group of terminals. A second group of signal terminals is connected to the detector groups so that a signal from a particular numbered detector of each of the detector groups is connected to individual ones of the second group of terminals. Both groups of signal terminals are, in turn, coupled to signal sensors so that when a signal is simultaneously observed in one of the first group of terminals and one of the second group of terminals the specific detector detecting a radiation event is determined. The sensors are arranged in such a manner that a binary code is developed from their outputs which can be stored in a digital storage means according to the location of the event in the multidetector device.

11 Claims, 7 Drawing Figures

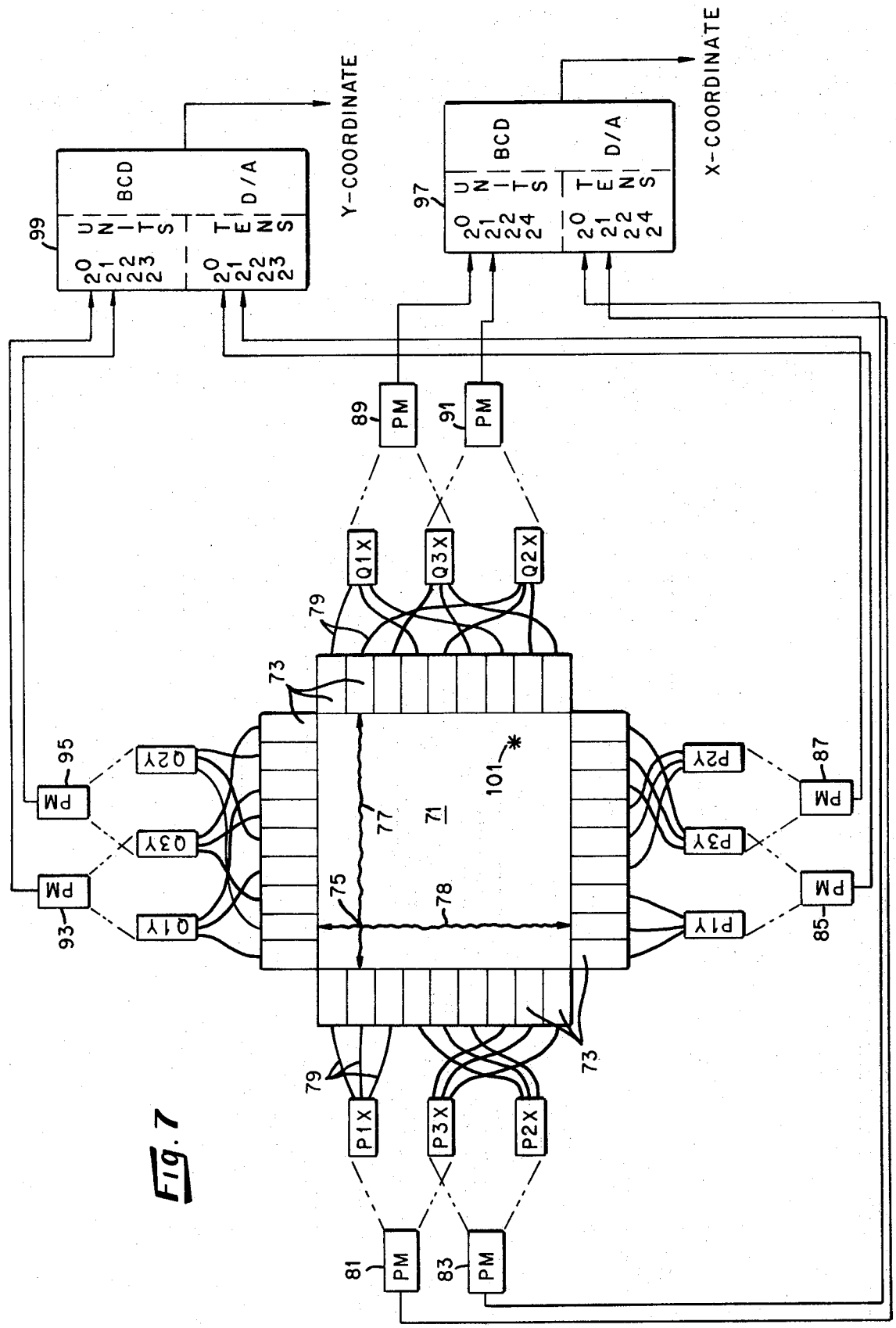

HODOSCOPE READOUT SYSTEM

REFERENCES

U. S. Pat. No. 3,308,438, issued Mar. 7, 1967, to Philip Spergel et al. for "An Autofluoroscope."

"Holdoscope Design To Minimize Photomultiplier Use," by L. W. Alvarez, Review of Scientific Instruments, Vol. 31, No. 1, 1960, p. 76.

U. S. Pat. No. 2,632,058, issued Mar. 17, 1953, to Frank Gray for "A Pulse Code Communicator."

"Mathematical Games," by Martin Gardner, Scientific American, August 1972, pp. 106–109.

BACKGROUND OF THE INVENTION

The present invention was made during the course of, or under, a contract with the United States Atomic Emergy Commission.

This invention relates generally to radiation multidetector readout systems and more specifically to a multidetector readout system for digital processing with a minimum of interfacing equipment.

In radiation multidetector devices, especially for spatial radiation detection, it is common practice to monitor spatial radiation detection systems, such as multiwire proportional counters or arrays of multidetectors, by separate detection channels for each element of a multiwire counter, multielement scintillation counter or other multidetector arrays. Individual events in discrete portions of a detector array are sensed individually by separate detection channels and fed into a memory device by means of an X-Y coordinate address register. This straightforward technique requires a number of detection channels at least equal to the number of increments of resolution along the X and Y axis of the detector array or multiple wire array. These detector systems may be composed of hundreds or even thousands of radiation detection elements in a spatial detection system, thereby requiring hundreds of signal sensing channels for readout and recording.

A typical system of the prior art is described in the above-referenced U.S. Pat. No. 3,308,438.

The apparent prior necessity for a number of detection channels equal to at least the number of X and Y resolution components of a detector array to locate an event for storage becomes expensive and difficult to construct for detector system arrays with hundreds of resolution components or collector wires. Thus, there is a need for a system for reading out a radiation multidetector device without the complexity and expense of prior readout devices and providing the readout in digital form.

Radiation detection devices have been provided in the art of radiation detection which provide a digital coded output. These devices employ masks which block portions of the detector in a manner to provide the digital readout. This technique has been used primarily to determine the position of a beam of radiation along the length of a plurality of detectors. The beam of radiation is directed onto the detectors transversely to its length and as it is moved along the detectors. The masking means through which the radiation impinges on the detectors along parts of their length produces at the various outputs from the different detectors a digital indication of the position of the beam along the detectors.

A similar technique has been developed by L. W. Alvarez for a spatial detection system in which layers of scintillation material are differently masked and each optically coupled to separate photomultiplier tubes from which a binary coded signal is developed to indicate the position of radiation through the detector layers. This design requires that the number of photomultiplier tubes be equal to the number of layers of the detector, e.g., five layers are required for a 64-element linear array and ten layers for a 64 × 64 element array.

The present invention requires only a single layer for a linear array and, in one embodiment, two layers for an X-Y hodoscope regardless of the number of detectors or the number of photomultiplier tubes. Therefore, in the present invention the thickness of the hodoscope can be reduced greatly over that proposed by Alvarez, which is often necessary in the measurement of radiation. This present method can also be utilized for gamma ray mapping, such as in a gamma ray camera, which could not be achieved by a multilayer design.

SUMMARY OF THE INVENTION

In view of the above, it is an object of this invention to provide a radiation hodoscope readout system which requires a minimum number of readout channels for direct digital storage of the location of radiation events with the hodoscope.

It is another object of this invention to provide an improved method of mapping gamma ray images.

Yet another object of this invention is to provide a one or two dimensional digital readout system from a single layer of scintillation material.

Briefly, this invention is a digital readout system for a spatial radiation detection medium which generates a signal at a location indicative of the position of a radiation event detected by a radiation sensitive area lying within a single plane in the detection medium, comprising: a plurality of signal terminals; a signal transmitting means for connecting selected groupings of the radiation sensitive areas of the detecting medium to respective ones of said signal terminals; a plurality of signal sensing means responsive to signals from selected groupings of the signal terminals for generating a digital coded signal whose code is indicative of the location of the event within the detection medium; and means for recording said digital signal.

Other objects and many of the attendant advantages of the present invention will be obvious from the following detailed description taken in conjunction with the accompanying drawings.

BRIEF DESCRIPTION OF THE DRAWINGS

FIG. 7 is a schematic diagram of an alternate two-dimensional detector readout system according to the present invention.

DETAILED DESCRIPTION

Figure 1:
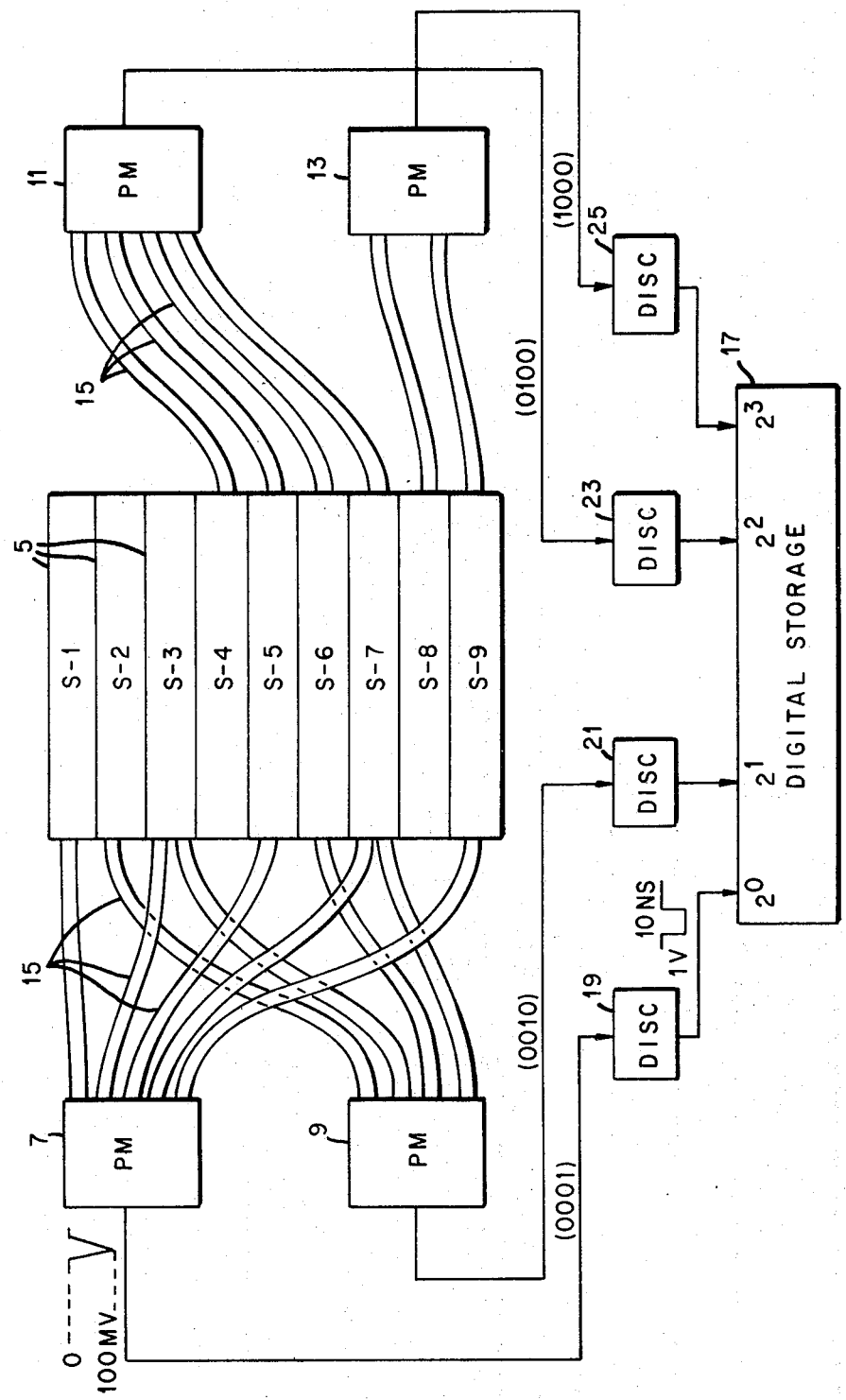
FIG. 1 is a schematic diagram of a simple embodiment of a multidetector readout of the present invention.

Referring now to FIG. 1, there is shown an array of detecting elements in the form of a plurality of scintillation strips 5. Although only nine strips, indicated as S-1 through S-9, are shown to illustrate the invention, it will be understood from the following description that any number of scintillation strips or other radiation detection means may be read out in the same manner. As illustrated in FIG. 1, it will be seen that only four photomultiplier tubes 7–13 are necessary to provide a digital readout which will indicate any one of the nine scintillation strips 5 detecting a radiation event. Typically, the strips 5 are wrapped, or coated, with the exception of the two end portions with a material, which is opaque to light and yet pervious to ionizing radiation, such as aluminum foil to prevent light emitting scintillations in one of the strips from being transmitted through adjacent strips. The light scintillations generated in the strips 5, caused by absorption of ionizing radiation, are transmitted to the photomultiplier tubes 7–13 by means of uniform cross section light pipes 15, typically fabricated from lengths of Lucite or other suitable light conducting material. To derive a digital code in the simplest manner, the strips 5 are connected to corresponding ones at the photomultiplier tubes according to Table I.

TABLE I

| No. | Binary Code | Light Pipe Connections | | | |
|---|---|---|---|---|---|
| | | PM-13 (1000) | PM-11 (0100) | PM-9 (0010) | PM-7 (0001) |
| 1 | (0001) | | | | S-1 |
| 2 | (0010) | | | S-2 | |
| 3 | (0011) | | | S-3 | S-3 |
| 4 | (0100) | | S-4 | | |
| 5 | (0101) | | S-5 | | S-5 |
| 6 | (0110) | | S-6 | S-6 | |
| 7 | (0111) | | S-7 | S-7 | S-7 |
| 8 | (1000) | S-8 | | | |
| 9 | (1001) | S-9 | | | S-9 |

Thus, it will be seen from Table I that any number of strips may be added to the array and connected to photomultiplier tubes to provide a binary coded output which can be stored in a digital storage means 17 or converted to an analog signal for display on an oscilloscope, for example, by employing a digital-to-analog converter.

As shown in FIG. 1, the outputs of the photomultiplier tubes 7–13 are connected to corresponding pulse discriminators 19–25 which convert the approximately 100 millivolt spike at the output of a photomultiplier tube to a 10 nonosecond, 1 volt pulse which can be used to trigger the digital storage device 17. The storage device 17 may be any type of well-known storage devices which have inputs according to bits of a binary code ($2^0 - 2^3$) which may be connected, respectively, to discriminators 19–25.

A system made up of n PM tubes thus connected is capable of handling $2^{n-1}$ strips. When several similar counters are used in a system where charged particles are expected to penetrate two or more counters, PM tube noise can be eliminated by requiring coincidence between counters. However, when one such counter is used independently, it is necessary to use codings as shown in Table II where the signal from each event is picked up by at least two PM tubes.

Figure 2:
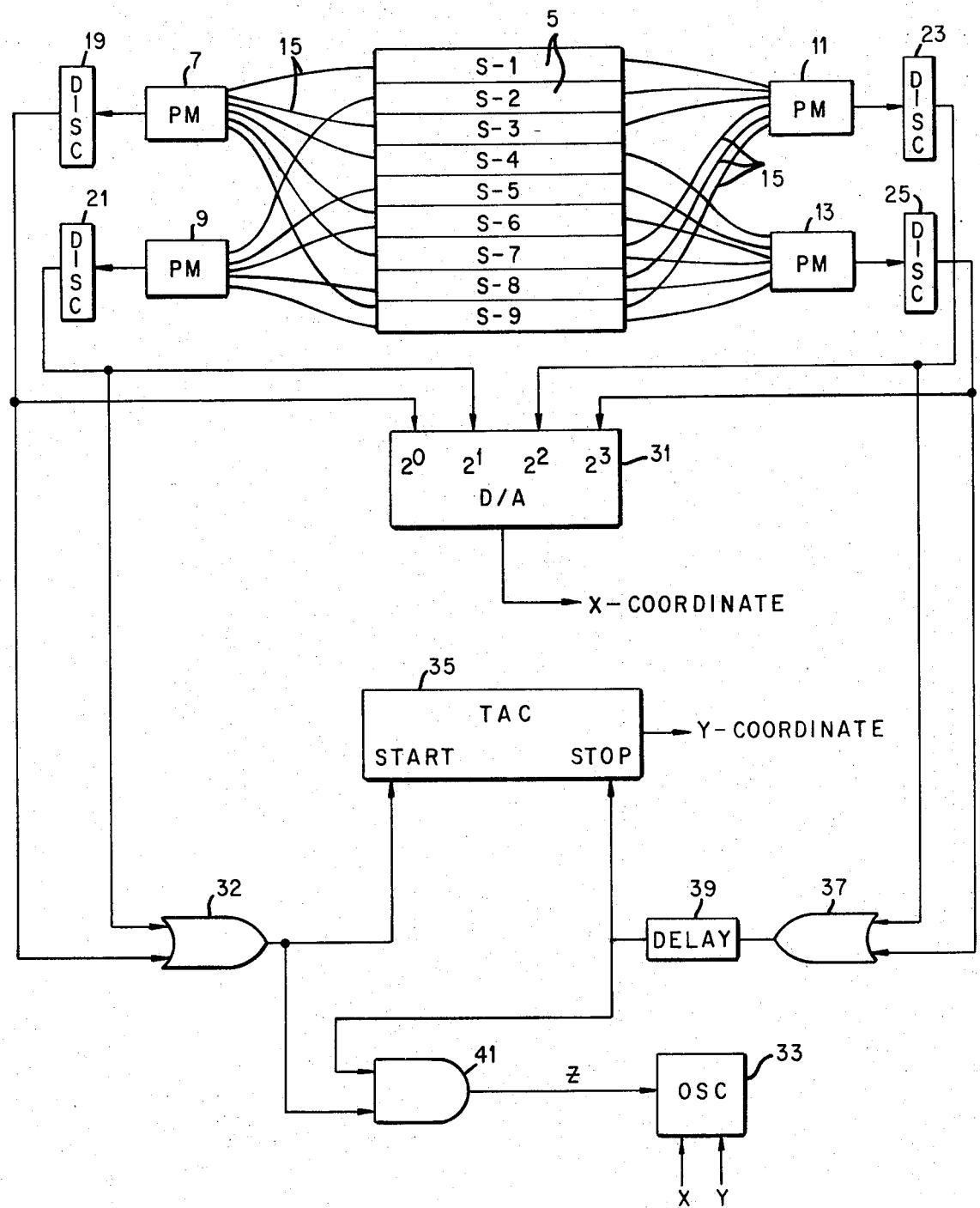
FIG. 2 is a schematic diagram of a multidetector readout system which provides two-dimensional readout.

Referring now to FIG. 2, there is shown an alternate embodiment of a readout system for two-dimensional radiation detection from an array of scintillator strips 5 identical to those of FIG. 1. In FIG. 2 like reference numerals indicate identical parts to those shown in FIG. 1. The light pipes 15 are shown schematically as single lines to aid in simplifying the drawing and are connected to photomultiplier tubes 7–13 according to a prescribed binary code of Table II.

TABLE II

| No. | Binary Code | Light Pipe Connections | | | |
|---|---|---|---|---|---|
| | | PM-13 (1000) | PM-11 (0100) | PM-9 (0010) | PM-7 (0001) |
| 1 | 0101 (5) | | S-1 | | S-1 |
| 2 | 0110 (6) | | S-2 | S-2 | |
| 3 | 0111 (7) | | S-3 | S-3 | S-3 |
| 4 | 1001 (9) | S-4 | | | S-4 |
| 5 | 1010 (10) | S-5 | | S-5 | |
| 6 | 1011 (11) | S-6 | | S-6 | S-6 |
| 7 | 1101 (13) | S-7 | S-7 | | S-7 |
| 8 | 1110 (14) | S-8 | S-8 | S-8 | |
| 9 | 1111 (15) | S-9 | S-9 | S-9 | S-9 |

It will be seen from Table II that a binary code is selected which insures that each strip 5 is connected to at least one photomultiplier tube on the right end and at least one on the left end for a purpose which will now be explained.

The photomultipliers 7–13 are again connected to discriminators 19–25, as in FIG. 1, which are, in turn, connected to the inputs of a digital-to-analog converter 31. The converter 31 provides an analog output signal whose amplitude is indicative of the one of said scintillation strips 5 detecting an event. This signal may be used to activate the X-coordinate input of an X-Y recorder, such as the X-Y oscilloscope 33, shown in FIG. 2. By connecting the photomultiplier tubes 7–13 as shown, a timing circuit means may be used to obtain a Y-coordinate signal which indicates the position of the event along a scintillator strip 5.

The outputs of discriminators 19 and 21 are connected to the inputs of an OR gate 32 whose output is connected to the start input of a time-to-amplitude converter (TAC) 35. The outputs of discriminators 23 and 25 are connected to the inputs of another OR gate 37 whose output is connected through a delay circuit 39 to the stop input of TAC 35. The delay 39 is set at a value which is equal to or greater than the propagation time of a light pulse through the length of a strip 5. The analog signal output from TAC 35 is then indicative of the position of an event along a strip 5.

The Y-coordinate signal from TAC 35 is also connected to the oscilloscope 33, or other X-Y recording device, at the Y-axis input thereof. The oscilloscope may be synchronized by applying a sync pulse to the Z input thereof. An AND gate 41 is provided which has one input connected to the output of OR gate 32 and the other input connected to the output of delay circuit 39. The output of AND gate 41 is then connected to the Z input of oscilloscope 33. A sync pulse is generated when the stop signal is applied to TAC 35 at which time both the X and Y coordinate signals are present for recording. The output pulses from the discriminators 19–25 must be set at a width which will insure that AND gate 41 is activated by the delay stop pulse.

In operation, the circuit of FIG. 2 will provide an X-Y recording of an event within the plane of the multiple scintillation strips 5. A pulse from either photomultiplier tube 7 or 9 will start a time-to-amplitude conversion in TAC 35 which is stopped at a delayed time after a pulse from either photomultiplier tube 11 or 13. Since all the light pipes 15 are of equal length, the time of measurement is an indication of the position of the event along the strips 5 and provides the Y-coordinate signal. This signal is combined with the X-coordinate signal from D/A 31 and recorded at the end of a TAC 35 conversion to indicate the position of the event on the X-Y oscilloscope 33.

Again it will be understood that any number of strips may be added to the hodoscope array as long as the binary coded signal provides at least one signal from each end of the array of strips 5. A very convenient coding for a large number of arrays will be discussed later in this application.

Figure 3:
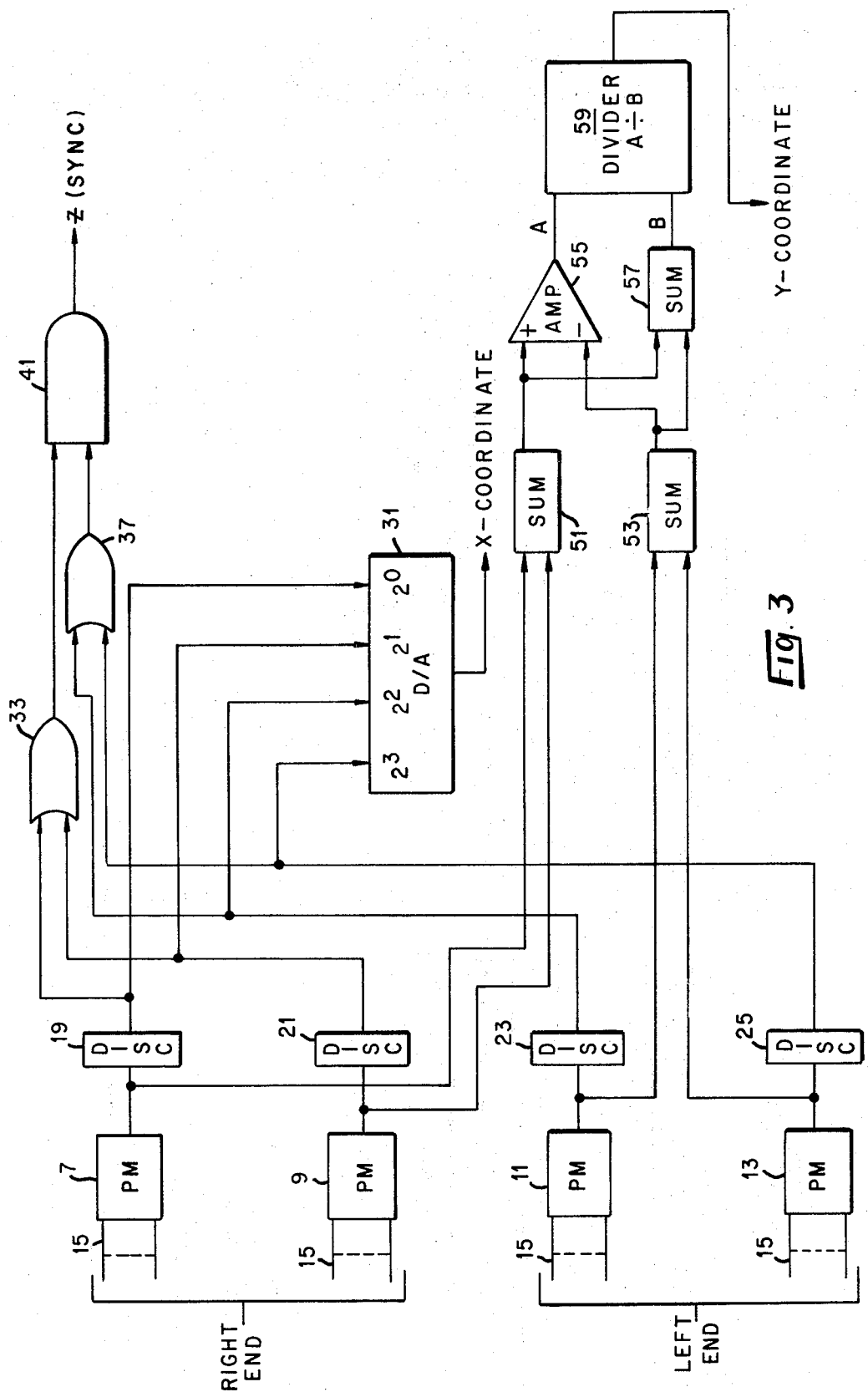
FIG. 3 is a schematic diagram of an alternate readout system for use with the detector array of FIG. 2 for two-dimensional readout.

Referring now to FIG. 3, there is shown another circuit means for obtaining a two-dimensional (X-Y) output from an array of scintillation strips 5, as shown in FIG. 2. Beginning with the photomultiplier tubes 7-13, which are connected by means of light pipes 15 to the right and left ends of nine strips 5, as shown in FIG. 2, the sync pulse (Z) is obtained in the same manner as by connecting the outputs of discriminators 19 and 21 to the inputs of OR gate 32 and the outputs of discriminators 23 and 25 to OR gate 37 and connecting the outputs of OR gates 32 and 37 to the input of an AND gate 41. The X-coordinate signal is also obtained in the same manner as above by connecting the outputs of discriminators 19-25 to the corresponding inputs of a digital-to-analog converter 31. However, the Y-coordinate signal is determined in a different manner as will now be described.

As shown in FIG. 3, the outputs of PM tubes 7 and 9 are connected to respective inputs of a first summing network 51 and the outputs of PM tubes 11 and 13 are connected to the respective inputs of a second summing network 53. The outputs of summing networks 51 and 53 are connected, respectively, to the non-inverting (+) input and the inverting (−) input of an operational amplifier 55 which is wired in a conventional manner to provide a signal (A) at the output thereof which is the difference of the two inputs. A third summing network 57 having its inputs connected to the outputs of the first (51) and second (53) summing networks provides an output signal B which is the sum of all the signals from the right and left ends of a strip 5. The output A of amplifier 55 is connected to an input of a divider network 59 and the output B of summing network 57 is connected to the other input of divider 59 so that the output of divider 59 is the Y-coordinate signal equal to A divided by B. In this mode, each PM tube may receive only a fraction of the light signals. However, the total intensity of a light signal can be recovered by summing all analog signals of PM tubes on each side.

Figure 4:
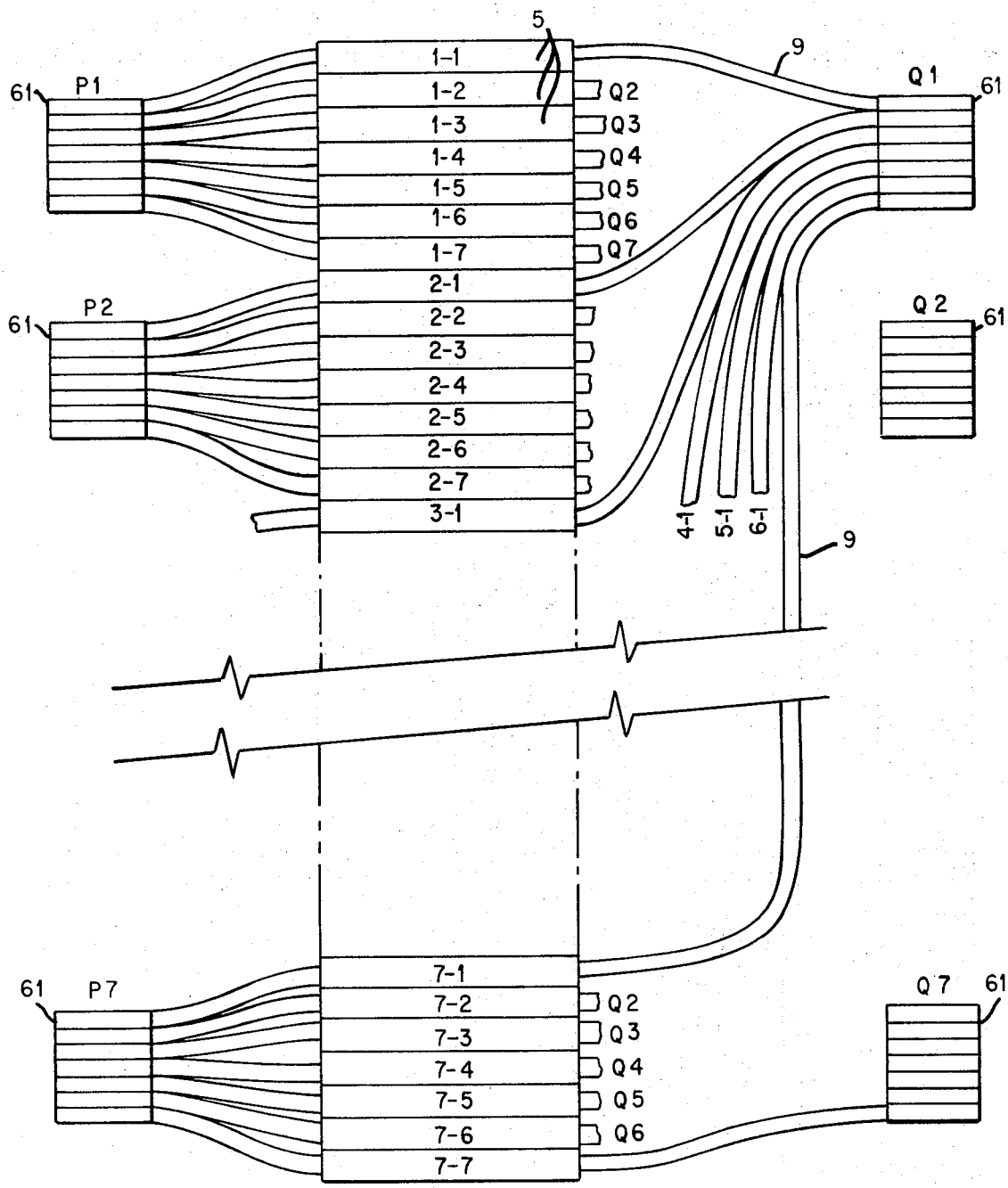
FIG. 4 is a schematic diagram of an alternate light pipe connection scheme according to the present invention for readout of a large array of detector elements.

Referring now to FIG. 4, there is shown an alternate connection scheme for a greater number of detectors such as an array of scintillation strips 5 identical to those of FIG. 1 and designed as (1,1), (1,2), (1,3), etc., through (7,7), including forty-nine strips in all. Optically coupled to the array of scintillation strips are a plurality of light conducting terminals 61 consisting of seven P terminals (P-1 through P-7) and seven Q terminals (Q-1 through Q-7). These terminals are typically made of light conductive material and may consist of bundles of light pipes 15 connecting the terminals 61 to the strips 5.

The strips 5 are first divided into P groups of seven strips per group. The first P group includes the strips (1,1) to (1,7), each of which is connected by means of individual light pipes 15 to the light transmitting terminal P-1. The second group of strips (2,1) to (2,7) inclusive are similarly connected by individual light pipes 15 to terminal P-2 and so forth until the strips of each of the seven groups are connected to the corresponding P terminal.

The strips 5 are then divided into Q groups with seven strips in each Q group as exemplified in the light pipe 15 connections to one Q terminal (Q-1) as shown in FIG. 4. The first Q group connected to terminal Q-1 combines the signals from seven strips (1,1) to (7,1), inclusive. The second Q group connected to terminal Q-2 combines the signals from another seven strips (1,2) to (7,2), inclusive and so forth until all the terminals are similarly connected to the Q terminals Q-1 through Q-7.

When a signal is simultaneously observed in a P group and a Q group the specific detector strip 5 activated by an event is uniquely determined. For example, if detector strip (2,1) is struck by ionizing radiation, terminal P-2 and terminal Q-1 would each receive a signal simultaneously. These simultaneous signals may be observed by two of fourteen sensors, one and only one in the P group and one and only one in the Q group.

Figure 5:
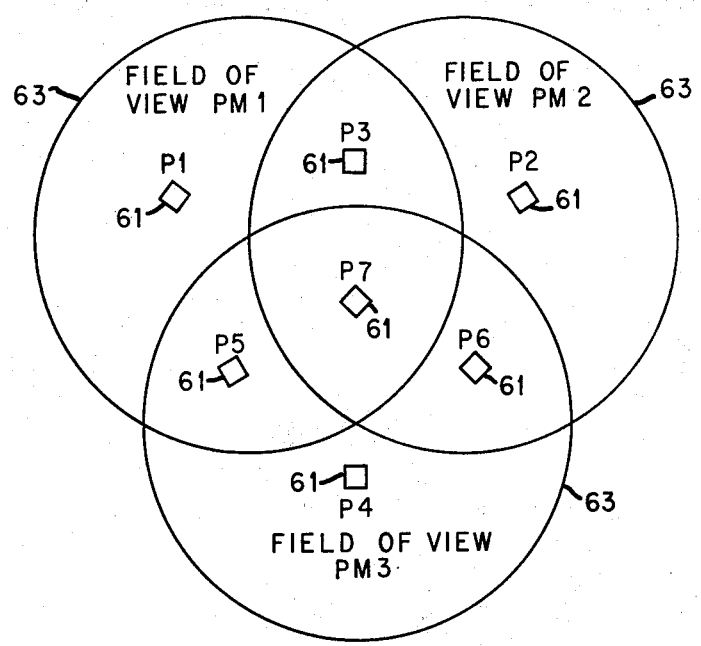
FIGS. 5 and 6 are diagrams of the geometric arrangements of the light terminals of FIG. 4 which are viewed by photomultiplier tubes whose region of view normal to the plane of the terminals is shown by circles.
Figure 6:
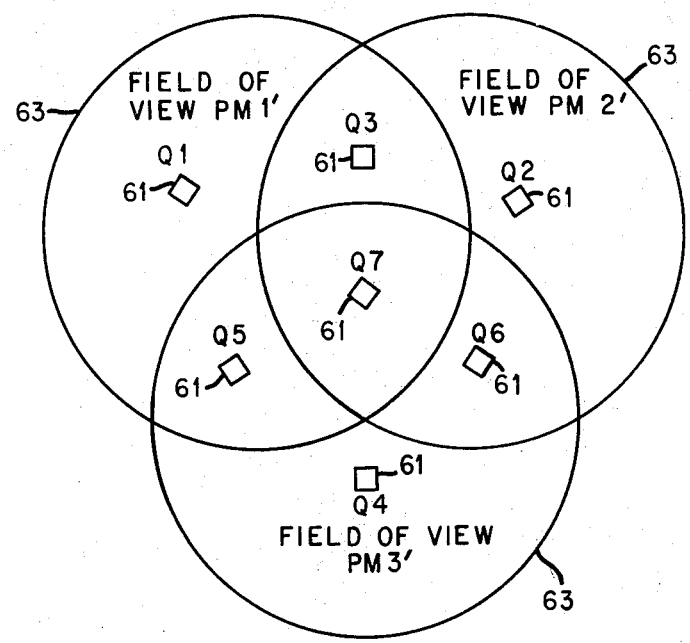

However, as shown in FIG. 5 and 6, the number of sensors, in this case photomultiplier tubes schematically illustrated by circles 63 indicating their field of view, is reduced to six for reading out the fourteen (P and Q) terminals, shown in FIG. 4. As shown in FIG. 5, the circles indicating the field of view of three PM tubes 63 overlap in a common plane so as to form seven adjoining areas. The output end of each P group of detectors 61 (P terminals) lies within each of these seven adjoining areas as shown by the blocks 61 with their terminal designations P-1 through P-7. The Q terminals (Q-1 through Q-7) are oriented in the same manner, as shown in FIG. 6.

The three photomultiplier tubes (PM1, PM2, and PM3) are placed at a suitable normal distance from the terminal plane so that each PM tube receives light signals from only one of the circled areas 63.

Thus, PM1 views terminals P-1, P-3, P-5, and P-7; PM2 views P-2, P-3, P-6, and P-7; and PM3 views P-4, P-5, P-6, and P-7. Hence, light signals coming from terminal P-1 are received by PM1 only, light signals coming from terminal P-3 will only be received by PM1 and PM2, and so forth with all three PM tubes receiving light signals from P-7 only. The seven Q terminals are treated in the same manner, as shown in FIG. 6.

Combinations of the outputs from the PM tubes from both the P and Q groups, therefore, uniquely determine which of the forty-nine detector strips 5 of FIG. 4 has detected a radiation event which generated the light signals. It will be understood as pointed out above that detection systems other than scintillation type detectors may be read out in the same manner. For example, a multiwire proportional counter may have the collector wires connected to corresponding P and Q terminals as the light pipes are connected and through gating circuits may be combined into three outputs for each set of terminals (P and Q) similar to the PM tube outputs.

The arrangement shown in FIGS. 5 and 6 can be considered as a binary coding system in which the outputs of the three PM tubes in each group represent the first, second, and third digits, respectively, of a binary number which, in turn, represents the P and Q number of the light outputs. For example, if an event is detected in strip (2–3) of FIG. 4, terminals P-2 and Q-3 will transmit light signals which activate PM2 and PM1' and PM2' which is a binary representation of 010 and 011, respectively, or 2 and 3 in the base ten system.

Thus, it will be seen that the six PM tubes could be connected as in FIGS. 1–3 to provide the digital storage of events detected by the 49 strips or provide an X-Y recording, as in FIGS. 2 and 3. The three PM tubes for detection on the right end of the strips 5 (FIG. 4, Q terminals) may be connected to the units inputs of a binary coded decimal (BCD) digital-to-analog converter to replace the D/A 31 of FIGS. 2 or 3. Similarly, the PM tubes for detection on the left may be connected to the tens inputs of the BCD digital-to-analog converter as will be explained with reference to FIG. 7. The analog output would then correspond to the number 11 for strip number 1, 21 for strip 8, etc., the last strip would correspond to number 77, the forty-ninth strip 5 of FIG. 4. The remainder of the circuit of FIGS. 2 and 3 would remain essentially the same with the OR gates 33 and 37 each having three inputs connected to the corresponding three PM tube output lines through pulse discriminators connected, respectively, to the PM tube outputs.

A similar arrangement of eight PM tubes is sufficient for 169 detectors utilizing thirteen adjoining areas of the PM tube views corresponding to the intersection of four overlapping circles. Thus, it is possible to construct large hodoscope arrays of detectors at relatively low cost for sensors, such as the PM tubes for scintillation detectors, pulse amplifiers for multiple wire proportional counters, etc. As pointed out above, the readout of the hodoscope may be in binary form, which relates directly to the output of each PM tube, or in analog form using a digital-to-analog converter such as shown in FIGS. 2 and 3.

This invention may be further extended to provide an improved means of mapping gamma ray images, as in a radiation camera. Referring now to FIG. 7, there is shown a two-dimensional detection system using the readout technique of the present invention from a solid block of scintillation material 71. The block 71 is fitted with a plurality of light collimators 73, in this case nine on each side so as to illustrate the operation with a simplified drawing. It will be obvious from the ensuing discussion that any size scintillator 71 may be employed with the appropriate number of collimators 73 which will isolate a region of the material from which light is transmitted to divide the scintillator block 71 into a plurality of resolution or sensitive areas for locating events. Thus, the block 71 of FIG. 7 has eighty-one resolution areas corresponding to the nine light collimators 73 attached to each side of the block. Each collimator 73 limits the effective active area in the scintillator 71 so that only light pulses generated in a narrow band of scintillation material directly facing a collimator can pass therethrough. This arrangement is essentially equivalent to dividing the continuous scintillator 71 into strips, as in FIGS. 1–3. Light pulses produced at any point, as at 75, in the block 71 pass through only four collimators, as shown by wavy lines 77 and 78 illustrating the light propagation normal to the corresponding four collimators 73. This is the same as transmitting light along two orthogonal strips.

Each collimator is constructed identical with a length ($\lambda$) and width (W) where $W = L/n$, L being the length of the sides of the block 71 and n being the number of collimators 73 along one side of the block 71. In order to avoid the possibility that a light pulse generated in the scintillator block 71 could conduct through more than two adjacent collimators 73, the number of collimators should be greater than $2 L/\lambda$. Since the width W is $L/n$, the length ($\lambda$) of each collimator should equal 2 L.

The collimators 73 for the X-axis are connected to light conducting terminals P-1X through P-3X at one side of block 71 and Q-1X through Q-3X at the opposite side by means of light pipes 79 in the same manner, as illustrated in FIG. 4. The collimators 73 for the Y-axis are connected to light conducting terminals P-1Y through P-3Y on the lower side of block 71 and terminals Q-1Y through Q-3Y at the opposite, or upper, side by means of light pipes 79 in the same manner as those for the X-axis.

Eight photomultiplier tubes 81–95 including pulse disciminators, as illustrated in FIGS. 1–3, are used to view the various light terminals and produce a BCD output code which is registered by a pair of BCD digital storage means or BCD digital-to-analog converters 97 and 99 as illustrated to produce the X-coordinate and Y-coordinate outputs, respectively.

The PM tubes 81 and 83 are positioned to view the light pulses from terminals P-1X and P-2X, respectively, while both PM tubes 81 and 83 view light pulses from terminal P-3X. The nine collimators along each side of block 71 are divided into groups of three. The collimators along the X-axis in group one are connected to terminal P-1X, group two to P-2X, and group three to P-3X. The outputs of PM tubes 81 and 83 are connected to the $2^0$, $2^1$ inputs, respectively, of the tens decade scaler of BCD D/A 97 and indicate which of the three groups of collimators 73 along the X-axis receives a light pulse generated by an event. The Q-1X through Q-3X terminals are connected to the three groups of collimators along the other X-axis side of block 71 so that Q-1X is connected to the first collimator 73 of each group, Q-2X to the second of each group, and Q-3X to the third of each group and the PM tubes 89 and 91 are positioned to view the light from terminals Q-1X through Q-3X in the same manner as for the PX terminals. The outputs of PM tubes 89 and 91 are connected, respectively, to the $2^0$ and $2^1$ inputs of the units decade scaler of BCD D/A 97 to indicate the particular one of the three collimators 73 receiving light of the group indicated by the tens decade.

The Y-axis collimators 73 are connected to terminals P-1Y through P-3Y and Q-1Y through Q-3Y in the same manner as described above for the X-axis and viewed by PM tubes 85, 87 at the PY terminals and by PM tubes 93 and 95 at the QY terminals. The PM tubes 85 and 87 are then connected in the same manner to the tens decade scaler of BCD D/A 99 and the PM tubes 93 and 95 are connected to the units decade scaler of BCD D/A 99 to indicate the Y-coordinate position of an event while the D/A 97 indicates the X-coordinate of the event. It will be obvious here that any number of collimators 73 and thus any practical size scintillator block 71 may be used with the same connection scheme as described above both in reference to FIG. 7 and FIG. 4. The coding for the system would be as shown in Table III for the X-axis, the Y-axis being identical.

TABLE III

| Group | Binary Coding | Collimator Position | | |
|---|---|---|---|---|
| PX1 | 001 | 1 | 2 | 3 |
| PX2 | 010 | 4 | 5 | 6 |
| PX3 | 011 | 7 | 8 | 9 |
| QX1 | 001 | 1 | 4 | 7 |
| QX2 | 010 | 2 | 5 | 8 |
| QX3 | 011 | 3 | 6 | 9 |

Due to the finite length (λ) and finite width (W) of each collimator it is possible for a light pulse generated in the scintillator to be transmitted through two adjacent collimators and thus to four light terminals on each of the two axes. For example, if any event generates a light pulse at point 101 in block 71, the light would be collimated by both collimator positions 8 and 7 along the X-axis, counting from the top, and both collimator positions 8 and 9 on the Y-axis, counting from the left. Since the codings according to Table III are P: 010, 0: 010 and P: 011, Q: 011, respectively, their overlapping would generate a code 011, i.e, both PM tubes for the PX terminals and the QX terminals will be triggered, therefore, it appears as though the light pulse comes from collimator position 9 on both axes, which would be represented in the BCD D/A converters as the number 33. This ambiguity can be avoided by using a reflected Gray Code instead of BCD, i.e., by rearranging the ordering in the Q groups, and reassignment of codings as shown in Table IV.

TABLE IV

| Group | Terminal | Coding | Collimator Position | | |
|---|---|---|---|---|---|
| | PX1 | 001 | 1 | 2 | 3 |
| P | PX2 | 011 | 4 | 5 | 6 |
| | PX3 | 010 | 7 | 8 | 9 |
| | QX1 | 001 | 1 | 6 | 7 |
| Q | QX2 | 011 | 2 | 5 | 8 |
| | QX3 | 010 | 3 | 4 | 9 |

With this arrangement any light pulse transmitted through two adjacent collimators is located as though it comes from one of the transmitting collimators. For example, assume that an event generates a light pulse at point 101 in the scintillator block 71, then collimators in positions 8 and 7 along the X-axis would receive the light pulse and collimators in positions 8 and 9 along the Y-axis would receive the light pulse. This event would activate all eight PM tubes when connected as shown in FIG. 7. However, by reconnecting the light pipes 79 to the Q terminals, as shown in Table IV, and repositioning the P and Q terminals with respect to the view of the corresponding PM tubes, the outputs of the PM tubes would indicate the following code as derived from Table IV:

| Collimator Position X-Axis | | Collimator Position Y-Axis | |
|---|---|---|---|
| Position | Code | Position | Code |
| 7 | PX:010, QX:001 | 8 | PY:010, QY:011 |
| 8 | PX:010, QX:011 | 9 | PY:010, QY:010 |
| Output (8) | PX:010, QX:011 | Output (8) | PY:010, QY:011 |

Thus, the output location would be position 8 on the X-axis and position 8 on the Y-axis. Thus, it will be seen that any light pulse transmitted through two adjacent collimators is located as though it came from one of the adjacent collimators. The Gray Code to Binary Converter may be used to convert this new coding of Table IV to standard binary coding for application to the D/A converters 97 and 99. Additional information on Gray Code conversion may be had by reference to U.S. Pat. No. 2,632,058 and Scientific American, cited above.

The detector readout system of FIG. 7 and its alternative connection scheme may be used as the detecting element in a radiation pinhole camera (not shown) for mapping gamma ray images from an object such as a body organ having a distributed radioactive substance therein. The X-Y coordinate of the light pulses from the scintillator block 71 may be displayed on an X-Y oscilloscope using the analog signals at the outputs of D/A converters 97 and 99. Because of the lens effect of the pinhole collimator the X-Y location of the light pulse corresponds to an inverted X'-Y' location of the radiation gamma emitter in the source as is well known to those skilled in the art. The distribution of radioactive substances in the source is thus imaged in a photographic record of the oscilloscope display as in the Anger camera.

Although the invention has been illustrated with the use of scintillation hodoscopes, it will be understood that the readout system is applicable to other radiation detection hodoscopes as well.

What is claimed is:

1. A digital readout system for a spatial radiation detection medium which generates a signal at a location indicative of the position of a radiation event detected by one of a plurality of radiation sensitive areas lying within a single plane in said detection medium, comprising:

a plurality of signal terminals;

a plurality of signal transmitting means for connecting respective ones of of said radiation sensitive areas of said detecting medium to respective ones of said signal terminals according to a predetermined binary code;

a plurality of signal sensing means responsive to signals from selected ones of said signal terminals for generating output signals at respective outputs thereof indicative of the location of said event within said detection medium in coded digital form by the presence or absence of a signal from respective ones of said plurality of signal sensing means; and means for recording said digital signal.

2. The readout system as set forth in claim 1 wherein said readout system is a one-dimensional readout system and wherein said spatial radiation detection medium includes an array of individual detecting elements forming individual ones of said radiation sensitive areas.

3. The readout system as set forth in claim 2 wherein said array of detecting elements is a plurality of scintillation strips, said strips being coated with a light opaque material, and wherein said signal transmitting means includes a plurality of light pipes connected, respectively, to at least one end of each of said scintillator strips for transmitting light signals from said array of scintillator strips to respective ones of said plurality of signal sensing means.

4. The readout system as set forth in claim 3 wherein said plurality of sensing means includes a plurality of photodetectors disposed to view said signal terminals herein composed of the end clusters of said light pipes, each of said photodetectors generating an electrical output upon detection of light pulses transmitted thereto from the respective one of said scintillation strips, said light pipes being optically coupled to said plurality of photodetectors in a coded order so that the combined outputs of said plurality of photodetectors generates said digital coded signal.

5. The readout system as set forth in claim 4 wherein said means for recording said digital coded signal includes a digital-to-analog converter having a plurality of bit inputs connected to respective outputs of said plurality of photodetectors so that the amplitude of the analog output signal of said converter is indicative of the one of said plurality of scintillator strips detecting said radiation event.

6. The readout system as set forth in claim 1 wherein said readout system is a two-dimensional readout system wherein said spatial radiation detection medium includes an array of individual detecting elements in the form of a plurality of equal length scintillation strips, the length of said strips forming a Y-coordinate and the width of the combined plurality of said strips forming an X-coordinate for referencing the position of an event within said detection medium, and further including means for determining the Y-coordinate position of said event from the output signals of said plurality of sensing means.

7. The readout system as set forth in claim 6 wherein said plurality signal terminals are light conducting terminals divided into first and second equal groups, a first plurality of light pipes connecting each one of selected equal groupings of said scintillation strips to respective ones of said first group of terminals, a second plurality of light pipes connecting individual ones of each of said equal groupings of scintillation strips to respective ones of said second group of terminals so that the activated one of said strips detecting an event is located by a combined digital coding of the signals from said sensing means.

8. The readout system as set forth in claim 7 wherein said first and second plurality of light pipes are of equal length and wherein said means for determining the Y-coordinate position includes a time-to-amplitude converter having a start input and a stop input and an output, a first OR gate having a plurality of inputs connected to respective outputs of said sensing means of said first group of signal terminals, a second OR gate having a plurality of inputs connected to respective outputs of said sensing means of said second group of signal terminals, said first OR gate having an output connected to said start input of said time-to-amplitude converter and a signal delay means providing a time delay of at least the propagation time of a light pulse through the length of said scintillator strips and connected between the output of said second OR gate and said stop input of said time-to-amplitude converter.

9. The readout system as set forth in claim 1 wherein said radiation detection medium includes a single block of scintillation material having a first plurality of light collimators connected to one edge of said block, a second plurality of light collimators equal in number to said first plurality of light collimators connected to the opposite edge of said block and aligned respectively with said first plurality of collimators so that a light signal generated in said block from the detection of an event is transmitted through at least one of said first plurality of collimators and at least one corresponding light collimator of said second plurality of light collimators thereby dividing said block of scintillation material into said plurality of sensitive areas defined by the area of view of each pair of said first and second plurality of light collimators.

10. The readout system as set forth in claim 9 wherein said readout system is a two-dimensional readout system and further including a second and third equal plurality of light collimators connected identical to said first and second pluralities of light collimators along opposite edges of said block of scintillation material orthogonal to said first and second pluralities of light collimators so that the outputs of said plurality of sensing means connected to said first and second pluralities and said third and fourth pluralities of light collimators are indicative of an X and Y coordinate position of said event within said block of scintillation material.

11. The readout system as set forth in claim 10 wherein said block of scintillation material has a square radiation receiving face and wherein each of said first, second, third and fourth pluralities of light collimators is of identical size and number having a width at the face adjacent the corresponding edge of said block of scintillation material equal to the length of said face of said block divided by the number of collimators along the edge and a length equal to twice the length of said face of said block.

* * * * *